(12) United States Patent
McJunkin

(10) Patent No.: US 7,204,506 B2
(45) Date of Patent: Apr. 17, 2007

(54) RETRACTABLE HITCH SYSTEM

(75) Inventor: James McJunkin, Chula Vista, CA (US)

(73) Assignee: Nissan Design America, Inc., San Diego, CA (US)

( * ) Notice: Subject to any disclaimer, the term of this patent is extended or adjusted under 35 U.S.C. 154(b) by 167 days.

(21) Appl. No.: 11/005,484

(22) Filed: Dec. 7, 2004

(65) Prior Publication Data

US 2005/0161904 A1 Jul. 28, 2005

Related U.S. Application Data

(60) Provisional application No. 60/530,236, filed on Dec. 18, 2003.

(51) Int. Cl.
*B60D 1/54* (2006.01)

(52) U.S. Cl. .................................. 280/491.1; 280/491.3

(58) Field of Classification Search ............ 280/491.1, 280/491.3
See application file for complete search history.

(56) References Cited

U.S. PATENT DOCUMENTS

| | | | | | |
|---|---|---|---|---|---|
| 4,482,167 | A | * | 11/1984 | Haugrud | 280/491.3 |
| 5,906,387 | A | * | 5/1999 | Wallace | 280/491.3 |
| 6,189,910 | B1 | * | 2/2001 | Bartel | 280/491.2 |
| 6,719,318 | B1 | * | 4/2004 | Blake | 280/507 |
| 6,857,652 | B2 | * | 2/2005 | Dougherty | 280/507 |
| 6,969,084 | B2 | * | 11/2005 | Kaepp et al. | 280/500 |

FOREIGN PATENT DOCUMENTS

WO WO 9115374 A1 * 10/1991

* cited by examiner

*Primary Examiner*—Kevin Hurley
(74) *Attorney, Agent, or Firm*—Foley & Lardner LLP

(57) ABSTRACT

A hitch arrangement includes a hitch member, coupled to a towing vehicle. The hitch member is positionable in a stored position and in a deployed position and conforms to a contour of the rear end of the vehicle when in the stored position.

20 Claims, 3 Drawing Sheets

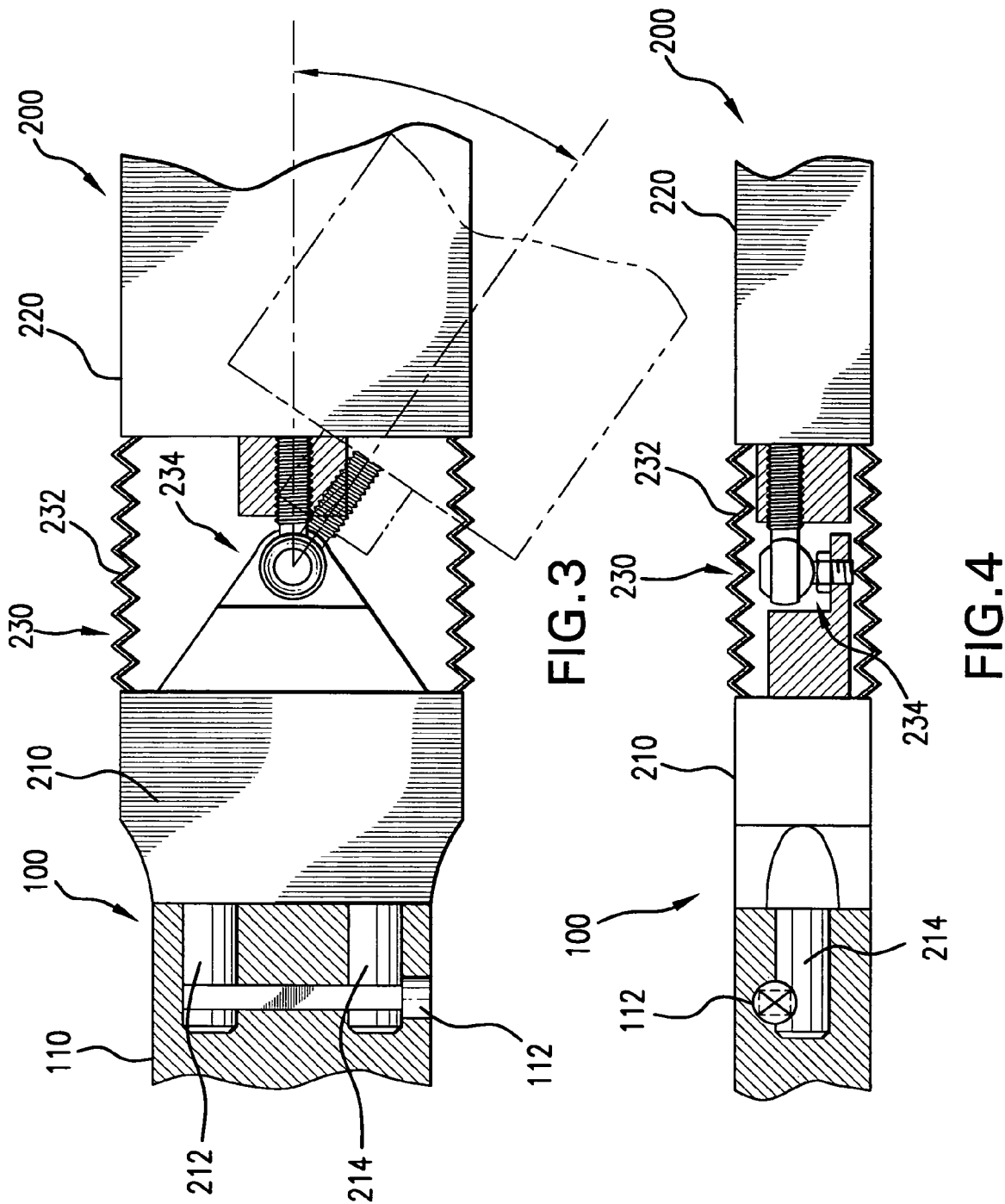

RETRACTABLE HITCH SYSTEM

CROSS-REFERENCE TO RELATED PATENT APPLICATIONS

The applicant claims priority to U.S. Provisional Patent Application Ser. No. 60/530,236, filed Dec. 18, 2003. The entire contents of this provisional application are incorporated herein by reference.

BACKGROUND OF THE INVENTION

The invention is directed to a hitch system suitable for coupling, for example, a passenger vehicle (car, pick-up truck, sport utility vehicle, minivan, and the like) and a trailer. More specifically, the invention is directed to improvements in such a hitch system.

SUMMARY OF THE INVENTION

The invention provides a hitch system which is retractable such that when the hitch system is not in use, the hitch system conforms to the shape of a bumper (or similar vehicle body part at the rear of a vehicle).

BRIEF DESCRIPTION OF THE DRAWINGS

Embodiments of the invention will be described below with reference to the accompanying drawings, wherein:

FIG. 3 is a plan view of the hitch system and tongue.
FIG. 4 is a side view of the hitch system and tongue.

DETAILED DESCRIPTION OF PREFERRED EMBODIMENTS

Figure 1:
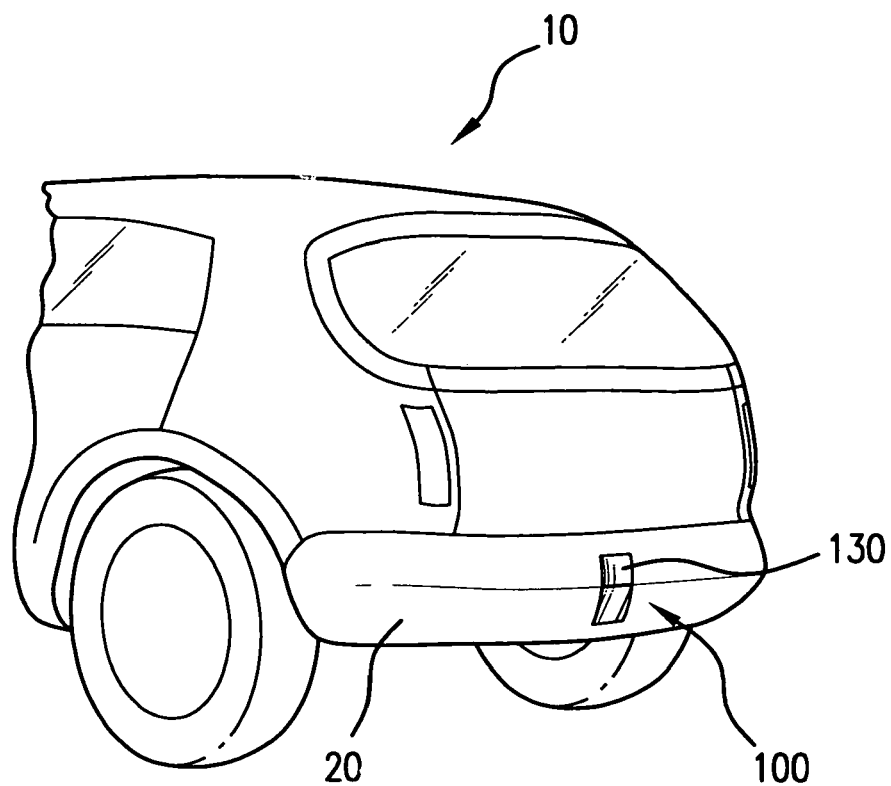
FIG. 1 illustrates a perspective view of a vehicle equipped with the hitch system of an embodiment of the invention in a stored position.

FIGS. 1–4 illustrate one preferred embodiment of the invention. As illustrated in FIG. 1, the embodiment provides a hitch system 100 for a towing vehicle 10. In FIG. 1, hitch system 100 is shown in a stored (or retracted) position. In the stored position, hitch system 100 is recessed in a bumper 20 (or other portion of the exterior of the vehicle at the rear end of the vehicle) such that the hitch system does not protrude significantly from the bumper 20. In the stored position, as shown in FIG. 1, an outermost face 130 of the hitch system is substantially flush with the contour of the bumper.

Figure 2:
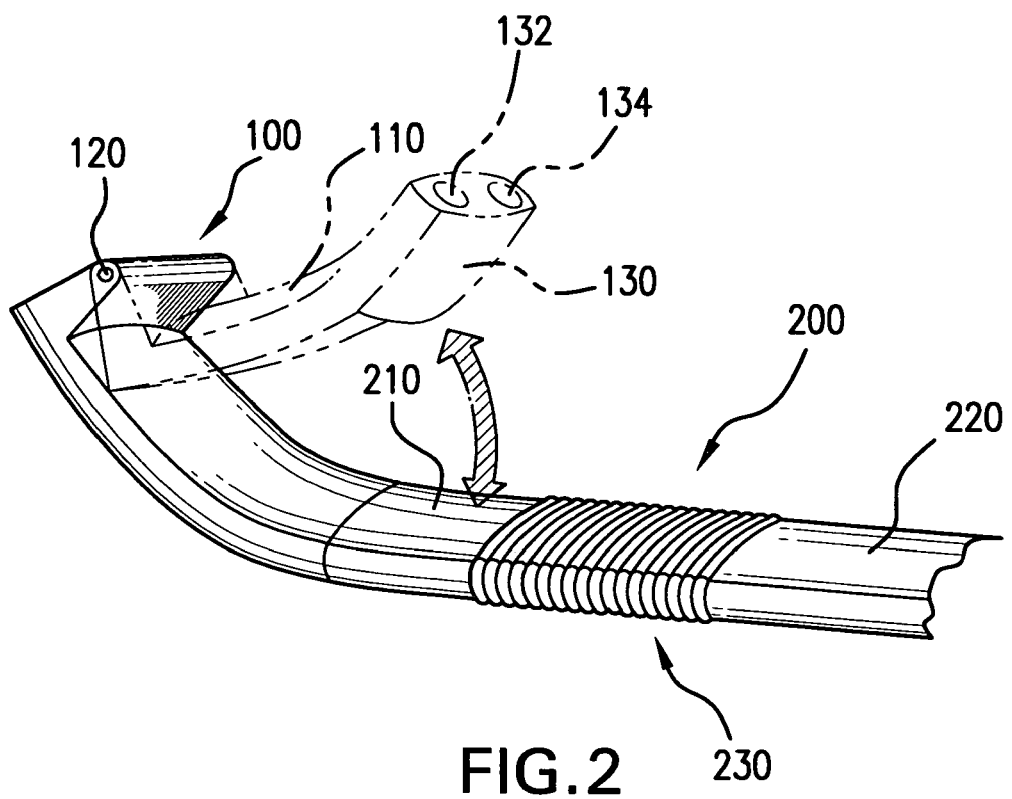
FIG. 2 is a more detailed view of the hitch system and a tongue of a trailer.

FIG. 2 is a more detailed view of hitch system 100 as used to tow a trailer via a tongue 200 of the trailer. (The trailer is not shown in FIG. 2 but is located to the right of the arrangement shown in FIG. 2.) In FIG. 2, the solid lines show the arrangement when the hitch system 100 is deployed and connected to tongue 200 to pull the trailer, and the position of hitch system 100 in the stored position is shown in dotted lines.

As shown in FIG. 2, hitch system 100 includes a generally curved hitch member 110 which follows the contour of the bumper when in the stored position and which pivots about a pivot point 120 to place the hitch member 110 in either the stored or the deployed position. The rear-most end of hitch member 110 includes pin connection openings 132 and 134 which will be described in further detail below While not shown in FIG. 2, it will be appreciated that the hitch system 100 is connected to the chassis or other portion of towing vehicle 10 by suitable structure.

As illustrated in FIG. 2, tongue 200 includes a hitch connection portion 210 and a trailer connection portion 220. Hitch connection portion 210 connects to hitch system 100. Trailer connection portion 220 connects to a trailer. An intermediate portion 230 is provided between portions 210 and 220 as will be described in further detail below. Hitch member 110, hitch connection portion 210, and trailer connection portion 220 have approximately the same cross section, for example, an oval or race track shape cross section. Other cross sections that provide adequate structural qualities may also be used.

FIGS. 3 and 4 illustrate more details of hitch system 100 and tongue 200. FIG. 3 is a partially sectional plan view and FIG. 4 is a partially sectional elevation view.

As illustrated in FIGS. 3 and 4, two pins 212 and 214 are connected to and protrude from hitch connection portion 210. When the hitch member 110 and hitch connection portion 210 are connected, pins 212 and 214 are inserted into pin connection openings 132 and 134 (shown in FIG. 2). A lock or fastener 112 retains pins 212 and 214 in openings 132 and 134. Other techniques for connecting the hitch member 110 and the hitch connection portion 210 may be employed such as other types of keyed or male/female connections, other mechanical connections that resist twist, etc.

As discussed above, intermediate portion 230 is provided between hitch connection portion 210 and trailer connection portion 220. Intermediate portion 230 contains an articulation point 234 which permits relative motion between hitch connection portion 210 (which is connected to hitch member 110) and trailer connection portion 220 (which is connected to the trailer). Articulation point 234 may be a heim joint, a spherical joint, a ball joint, or any other type of suitable assembly which permits relative motion. Articulation point 234 is covered by a flexible sleeve or bellows 232. The sleeve 232 protects articulation point 234 from the elements as well as improves the appearance of the overall assembly.

In FIG. 3, the position of trailer connection portion 220 shown by dotted lines illustrates how the articulation point 234 allows relative movement between hitch connection portion 210 and trailer connection portion 220. It should be noted that, in this embodiment, the articulation point is generally farther away from the vehicle than the pivotal point in conventional towing arrangements, and thus this embodiment may improve maneuverability in some situations.

Figure 5:
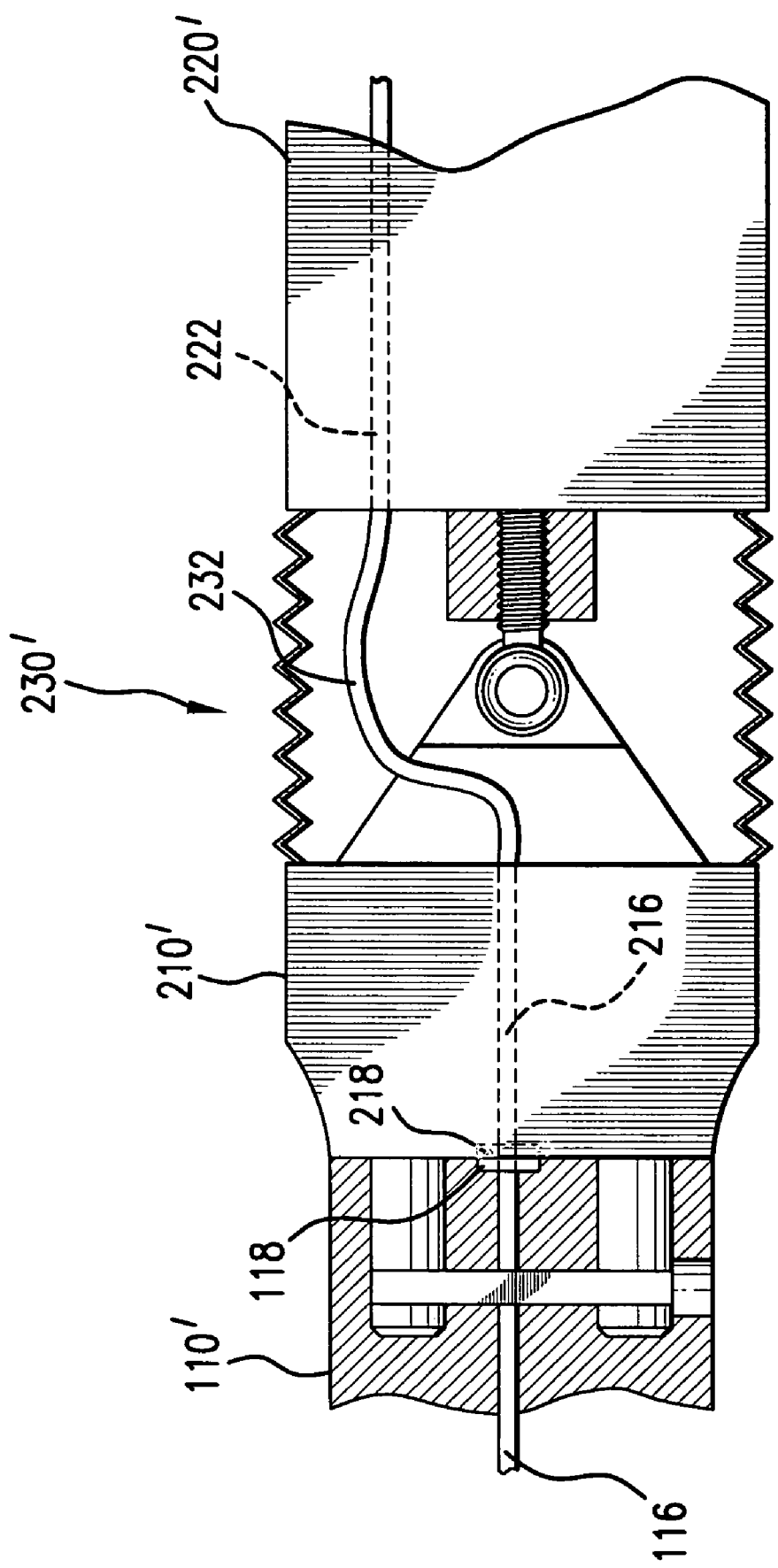
FIG. 5 illustrates a modification.

FIG. 5 illustrates a modification. In FIG. 5, electrical lines 116, 216, 232, and 222 are provided within hitch member 110', hitch connection portion 210', intermediate portion 230', and trailer connection portion 220', respectively. These electrical lines provide signals, for example, for braking and turning indications on the trailer. Electrical connectors 118 and 218 are provided on hitch member 110' and hitch connection portion 210', respectively, such that when pins 212 and 214 are inserted into pin connection openings 132 and 134, the electrical connection(s) between lines 116 and 216 are automatically made. The FIG. 5 arrangement thus provides physical protection for electrical signal lines as well as automatic connection thereof.

The foregoing description of preferred embodiments of the invention have been presented for purposes of illustration and description. It is not intended to be exhaustive or to limit the invention to the precise form disclosed. Modifications and variations will occur to those of skill in the towing field, and the precise form of the invention must be adapted to the particular application at hand. The scope of the invention is thus defined with reference to the following claims.

What is claimed is:

1. A hitch arrangement, comprising:
a hitch member, coupled to a towing vehicle, the hitch member being rotatable about an axis that is parallel to a rear bumper of the towing vehicle to position the hitch member in a stored position and in a deployed position, the hitch member conforming to a contour of the rear end of the vehicle when in the stored position.

2. A hitch arrangement, comprising:
a hitch member, coupled to a towing vehicle, the hitch member being positionable in a stored position and in a deployed position, the hitch member conforming to a contour of the rear end of the vehicle when in the stored position.
wherein the rear end of the vehicle adjacent the hitch member is curved and the hitch member has substantially the same curved shape.

3. A hitch arrangement as set forth in claim 1, wherein an outermost portion of the hitch member is substantially flush with the rear end of the vehicle when the hitch member is in the stored position.

4. A hitch arrangement as set forth in claim 1, further comprising:
a trailer having a tongue connected to the hitch member when the hitch member is in the deployed position.

5. A hitch arrangement as set forth in claim 4, wherein the tongue comprises a joint which permits relative motion between the trailer and the hitch member.

6. A hitch arrangement as set forth in claim 5, further comprising a flexible sleeve covering the joint.

7. A hitch arrangement, comprising:
a hitch member, coupled to a towing vehicle, the hitch member being positionable in a stored position and in a deployed position, the hitch member conforming to a contour of the rear end of the vehicle when in the stored position, and
a trailer having a tongue connected to the hitch member when the hitch member is in the deployed position,
wherein the tongue and the hitch member have the same cross section at the point where the tongue and the hitch member meet.

8. A hitch arrangement, comprising:
a hitch member, coupled to a towing vehicle, the hitch member being positionable in a stored position and in a deployed position, the hitch member conforming to a contour of the rear end of the vehicle when in the stored position, and
at least one electrical line internal to the hitch member.

9. A hitch arrangement, comprising:
a hitch member, coupled to a towing vehicle, the hitch member being positionable in a stored position and in a deployed position, the hitch member conforming to a contour of the rear end of the vehicle when in the stored position,
a trailer having a tongue connected to the hitch member when the hitch member is in the deployed position, and
at least one electrical line internal to the tongue.

10. A hitch arrangement, comprising:
a hitch member, coupled to a towing vehicle, the hitch member being positionable in a stored position and in a deployed position, the hitch member conforming to a contour of the rear end of the vehicle when in the stored position,
a trailer having a tongue connected to the hitch member when the hitch member is in the deployed position, wherein the tongue comprises a joint which permits relative motion between the trailer and the hitch member,
a flexible sleeve covering the joint, and
at least one electrical line internal to the sleeve.

11. A hitch arrangement, comprising:
a hitch member, coupled to a towing vehicle, the hitch member being positionable in a stored position and in a deployed position, the hitch member conforming to a contour of the rear end of the vehicle when in the stored position, and
a trailer having a tongue connected to the hitch member when the hitch member is in the deployed position,
wherein the hitch member includes at least one electrical line and the tongue comprises a hitch connection portion which includes at least one electrical line, and wherein the hitch member and the hitch connection portion are configured such that mechanical connection of the hitch member to the hitch connection portion also electrically connects the electrical line of the hitch member and the electrical line of the hitch connection portion to each other.

12. A hitch arrangement, comprising:
a hitch member, coupled to a towing vehicle, the hitch member being positionable in a stored position and in a deployed position, the hitch member conforming to a contour of the rear end of the vehicle when in the stored position such that at least part of the hitch member forms an exterior surface of the vehicle when in the stored position.

13. A hitch arrangement as set forth in claim 12, wherein the rear end of the vehicle adjacent the hitch member is curved and the hitch member has substantially the same curved shape.

14. A hitch arrangement as set forth in claim 12, wherein an outermost portion of the hitch member is substantially flush with the rear end of the vehicle when the hitch member is in the stored position.

15. A hitch arrangement as set forth in claim 12, further comprising:
a trailer having a tongue connected to the hitch member when the hitch member is in the deployed position.

16. A hitch arrangement as set forth in claim 15, wherein the tongue comprises a joint which permits relative motion between the trailer and the hitch member.

17. A hitch arrangement as set forth in claim 16, further comprising a flexible sleeve covering the joint.

18. A hitch arrangement as set forth in claim 15, wherein the tongue and the hitch member have the same cross section at the point where the tongue and the hitch member meet.

19. A hitch arrangement as set forth in claim 12, further comprising at least one electrical line internal to the hitch member.

20. A hitch arrangement as set forth in claim 17, further comprising at least one electrical line internal to the sleeve.

* * * * *